(12) United States Patent
Antesberger

(10) Patent No.: US 9,154,704 B2
(45) Date of Patent: Oct. 6, 2015

(54) RADIAL FPA BASED ELECTRO-OPTIC IMAGER

(71) Applicant: The United States of America, as represented by the Secretary of the Army, Washington, DC (US)

(72) Inventor: Anthony Wayne Antesberger, Woodbridge, VA (US)

(73) Assignee: THE UNITED STATES OF AMERICA AS REPRESENTED BY THE SECRETARY OF THE ARMY, Washington, DC (US)

( * ) Notice: Subject to any disclaimer, the term of this patent is extended or adjusted under 35 U.S.C. 154(b) by 0 days.

(21) Appl. No.: 14/564,273

(22) Filed: Dec. 9, 2014

(65) Prior Publication Data

US 2015/0146039 A1    May 28, 2015

Related U.S. Application Data

(62) Division of application No. 13/182,467, filed on Jul. 14, 2011, now Pat. No. 8,937,671.

(51) Int. Cl.
| | |
|---|---|
| *H04N 3/14* | (2006.01) |
| *H04N 5/335* | (2011.01) |
| *H04N 5/232* | (2006.01) |
| *H04N 5/369* | (2011.01) |
| *H04N 5/378* | (2011.01) |

(52) U.S. Cl.
CPC ......... *H04N 5/23293* (2013.01); *H04N 5/2327* (2013.01); *H04N 5/23212* (2013.01); *H04N 5/335* (2013.01); *H04N 5/369* (2013.01); *H04N 5/378* (2013.01)

(58) Field of Classification Search
USPC .......................................................... 348/294
See application file for complete search history.

(56) References Cited

U.S. PATENT DOCUMENTS

| | | |
|---|---|---|
| 5,986,816 A | 11/1999 | Shikama |
| 6,526,160 B1 | 2/2003 | Ito |
| 7,351,972 B2 | 4/2008 | D'Souza et al. |
| 2004/0145709 A1 | 7/2004 | Colucci et al. |
| 2004/0232336 A1 | 11/2004 | Antesberger |
| 2005/0082480 A1 | 4/2005 | Wagner et al. |
| 2008/0099683 A1 | 5/2008 | Schmidt et al. |

OTHER PUBLICATIONS

"muFly:360-Vision Camera," CSEM 2009, http://www.csem.ch/docs/show.aspx?id=12133.

*Primary Examiner* — Roberto Velez
*Assistant Examiner* — Stephen Coleman
(74) *Attorney, Agent, or Firm* — Richard J. Kim

(57) ABSTRACT

A radial based approach to electro-optic imagers, rather than the conventional rectilinear approach, would have basic overall system design advantages. Those system design advantages would apply to the components and the entire system implementation and include approaches to objective optical design, focal plane array FPA with fill factor, FPA layout and associated read-out integrated circuit ROIC, support electronics architecture and associated memory requirements, image processing IP algorithms, display layout and format, and eyepiece optics. A radial based approach to EO imagers would yield a device/system with attributes requiring less complicated optical components, with potentially fewer elements, for both the objective and eyepiece lenses. In addition, alternative objective optics could be more easily employed, such as holographic or wave front coded, due to reduced complexity of implementing correction algorithms as a result of referencing the system around its optical axis. The radial readout EO system would have pixel 'one' at the center and be 'read out and displayed' like the rings of a tree rather than words on a page.

10 Claims, 9 Drawing Sheets

- Active FPA area

- Discarded Optical Performance

RADIAL FPA BASED ELECTRO-OPTIC IMAGER

REFERENCE TO RELATED APPLICATIONS

This is a divisional patent application of copending application Ser. No. 13/182,467, filed Jul. 14, 2011, entitled "Radial Readout Approach to EO Imagers." The aforementioned application is hereby incorporated herein by reference.

GOVERNMENT INTEREST

The invention described herein may be manufactured, used, sold, imported, and/or licensed by or for the Government of the United States of America.

FIELD OF THE INVENTION

This invention relates in general to imaging systems, and more particularly, to electro-optic imaging systems.

BACKGROUND OF THE INVENTION

The state of the art in electro-optic (EO) systems is based upon the commercial convention of rectilinear FPAs using detector materials matched to the spectral region of interest. Conventional optics designs are generally circular for simplicity of production and optical performance considerations. Optical materials must have acceptable transmission in the spectral region of interest. A simple EO imaging system consists of an objective lens assembly, FPA, Read Out Integrated Circuit (ROIC), support electronics with power source(s), display drivers, display, and eyepiece lens assembly. As shown in FIG. 1, an object 110 in image space is projected onto an objective lens assembly 120, which focuses it onto a rectilinear focal plane array 130. A readout integrated circuit (ROIC) 140 with its support electronics and display drivers reads out the rectilinear focal plane array signals to a rectilinear display 150 which projects a reconstructed image of said object 110 onto an eyepiece lens assembly 160 for observer's viewing 170.

If a square peg needs to fit into a round hole, then the peg needs to be relatively smaller or the hole needs to be relatively larger; in either case, resources are being discarded. Analogously, in the EO system implementation realm, potential system performance is being compromised by a loss of pixel count as related to available optical area with surrounding optical performance potential not impinging on active pixels (see FIG. 2). Conventional rectilinear approaches to EO systems are based upon standard commercial products, such as televisions and computers, and have evolved into ever increasing pixel counts and aspect ratios. Using existing or future rectilinear approaches to integrate compact EO systems limits performance potential and will become more difficult as the demand for performance improvements and resolution increases.

The state of the art FPA and display technologies for compact EO imager systems are rectilinear, generally on the order of 1K×1K or 2K×1K pixel counts, with aspect ratios of either 4:3 (1280×1024) or 16:9 (1920×1200); flat Panel Displays have evolved in kind. Most systems operate at either 30 or 60 frames per second (fps or Hz) with interlaced or progressively scanned approaches to the FPA and associated display. Nominally, an EO imaging system with 1K pixels, forty (40) degree Field of View, and unity magnification would provide resolution of approximately 0.9 cycles/milliradian, or Snellen Acuity of approximately 20/40; average human vision is over a factor of two better at conventionally 20/20. Resolution requires improvement, with increased pixel counts and associated optical performance, to achieve normal human vision performance.

Processing capability and associated memory requirements for EO systems continue to increase, for simply reading the sensor data, as pixel counts and frame rates increase. In addition to the processing burden, IP algorithms for EO systems are increasingly becoming the standard for performance improvements concerning aberration control, edge enhancement, pixel interpolation, electronic zooming, frame integrations/averages, moving target indication, or any other chosen feature. System Size, Weight, And Power (SWAP) performance are all compromised by increasing processing demands.

SUMMARY OF THE INVENTION

A radial FPA based electro-optic imager is disclosed. Such an electro-optic imager comprises: an objective lens assembly to focus an image of an object present in an image space; a radial focal plane array capable of having an improved fill factor based on a circular or hexagonal layout; a read-out integrated circuit to read-out signals from said radial focal plane array using a radial addressing scheme and generate read-out signals; electronics and associated memory to process said read-out signals; an alternate display capable displaying the processed images based on said radial focal plane array; and eyepiece optics for viewing of said displayed images.

In another aspect, a radial readout process is disclosed for an electro-optic imager. Such a readout the process comprises: projecting an object in image space onto an objective lens assembly, which focuses an image of said object onto a radial sensor FPA; reading out signals from said radial sensor FPA using a readout integrated circuit to process signals with support electronics and display drivers having a reduced processing circuitry and memory; displaying a reconstructed image using an alternate display based on said processed signals; and projecting said display onto a simplified eyepiece lens assembly for observer's viewing.

Yet, in another aspect, an addressing method is disclosed based on a radial FPA having rings of pixels around a center pixel. Such an addressing method comprises: assigning an initial pair of address values to designate the center pixel of the radial FPA, wherein one of the address pair is a row address and another of the address pair is a ring address; assigning each ring of the rings of pixels a ring value using the ring address of the address pair, wherein each ring of pixels successively ringing said center pixel is assigned a unique ring value using said ring address of the address pair; and assigning each pixel of each ring of pixels a row value using the row address of the address pair.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
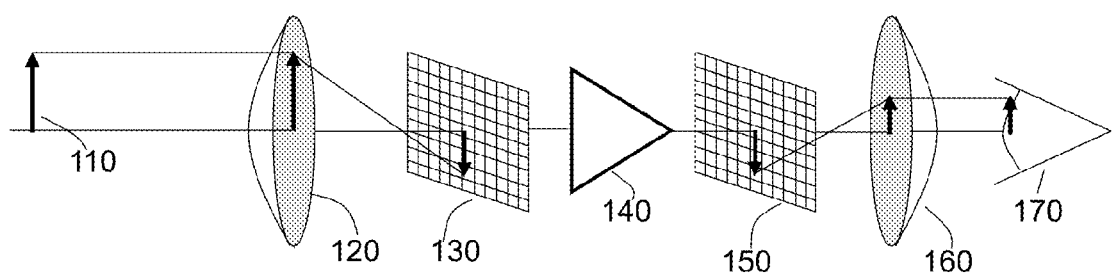
FIG. 1 shows an exemplary simplified electro-optic imaging system.
Figure 2:
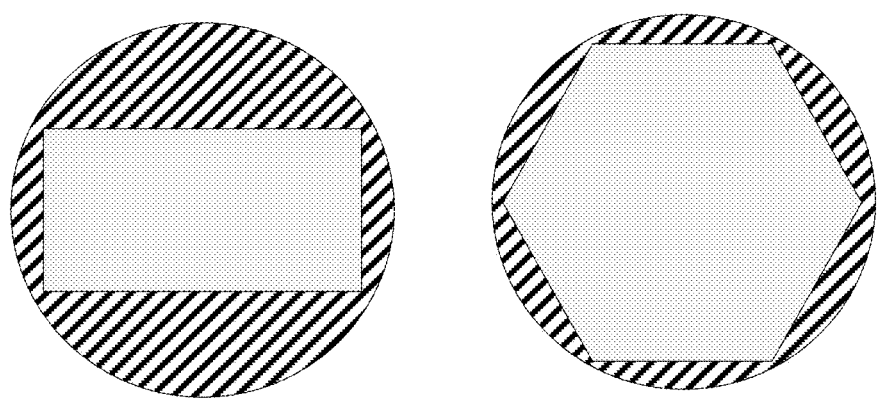
FIG. 2 shows two exemplary overlays of a focal plane array (FPA) active area superimposed on an optical system imaging area.
Figure 2:
Figure 2:

Matching circular optics to rectangular FPAs is cumbersome, and difficult to control distortion and aberration without excessive multiple elements, which leads to heavier, less transmissive, and more expensive optical solutions, especially if the rectangle is not a square. Matching circular optics to circular, or more circular, FPAs is a more natural fit. See, e.g., FIG. 2, which shows a comparison between an exemplary overlay of a rectangular focal plane array active area to a conventional optical system imaging area and an exemplary overlay of a hexagonal focal plane array to an optical system imaging area. Alternative pixel shapes, rather than conventional rectangular shapes, can lend themselves to a higher fill factor. Alternative pixel shapes also lend themselves to an alternative shape for the entire FPA; hexagonal, octagonal, and circular pixel shapes fill hexagonal, octagonal, and circular FPAs (see FIG. 2).

In an effort to simplify electro-optic (EO) imaging system design and implementation, a departure from the conventional rectilinear approach to EO imaging systems is disclosed. In this disclosure, the FPA, electronics, and display would arrange and address the detectors in a circular and/or radial layout, rather than a rectilinear layout, to more closely match standard circular optics performance and analysis at the objective and eyepiece optical components.

Figure 3:
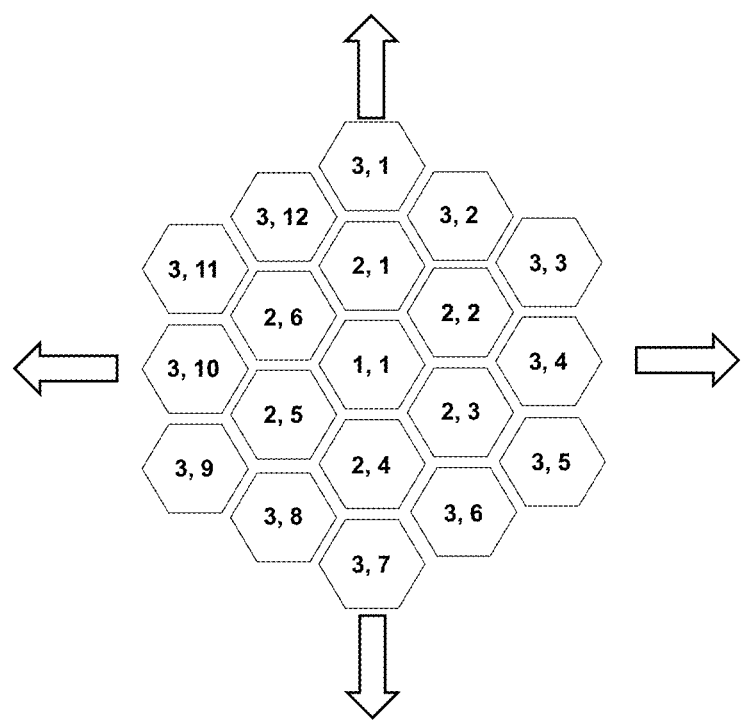
FIG. 3 shows exemplary rings and pixel reference assignments.
Figure 4:
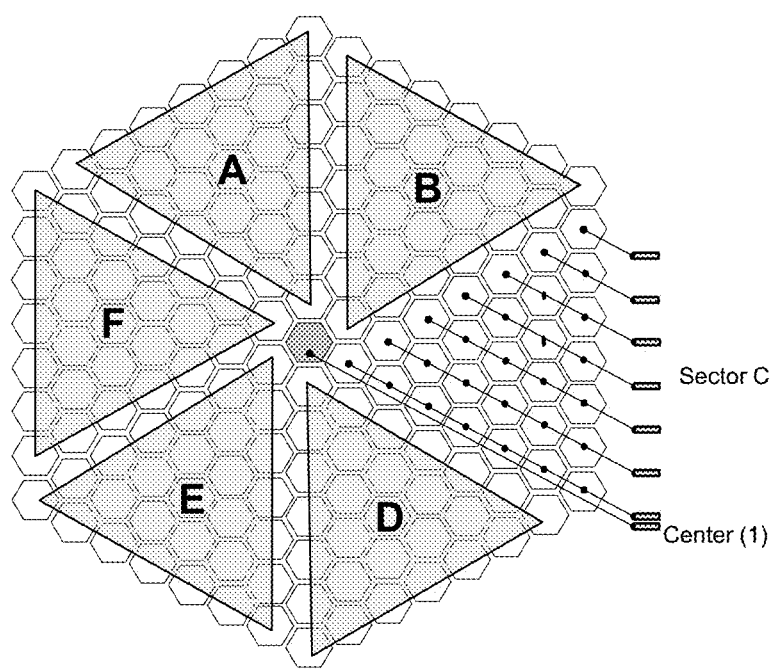
FIG. 4 shows exemplary FPA sectors and row access lines.
Figure 5:
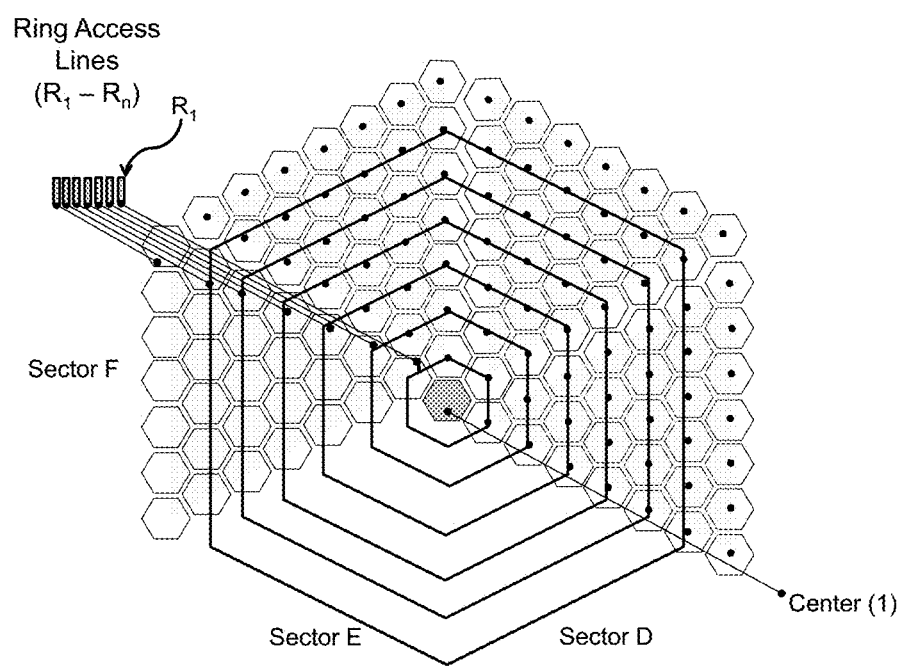
FIG. 5 shows exemplary pixel access ring assignments.
Figure 6:
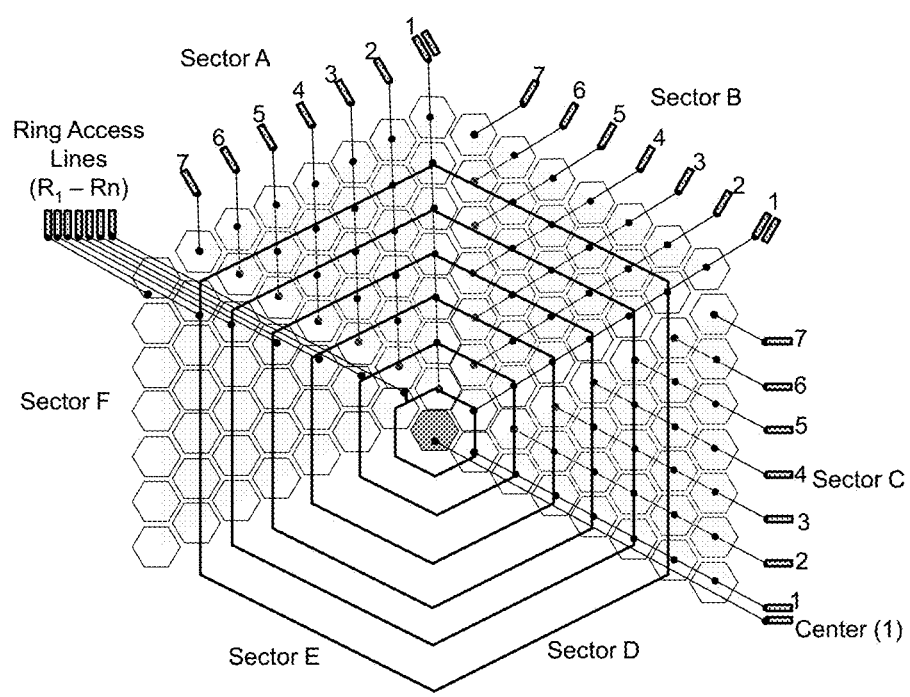
FIG. 6 shows exemplary pixel access row and ring assignments.

New FPA based EO imaging systems and components are disclosed based on a convention referenced to a central optical axis, rather than an arbitrary reference in optical space based upon pixel 1, 1 (upper left) of a rectilinear system approach. Rings and pixels would be labeled for convention and referenced as 1, 1 at the center, with the next ring and pixel being 2, 1 and labeled clockwise as 2, 2; 2, 3; 2, 4 etc. See, FIG. 3 for an exemplary pixel reference assignments (e.g., ring #, pixel #) where radial pixel reference assignments continue in all directions until the desired FPA size is achieved. Each pixel is addressed by Row and Ring access lines, except the center which has its own line. The FPA is broken into sectors with sector row access lines defined. See, e.g., FIG. 4 for exemplary FPA sector assignments and row access lines. Further, the Ring access lines are defined across all sectors. See, e.g., FIG. 5 for exemplary pixel access ring assignments. Center is addressed by itself, pixel 2, 1 is addressed by lines A1, R1; pixel 2, 2 is addressed by lines B1, R1; pixel 2, 3 is addressed by lines C1, R1. Progressively, pixel 3, 5 is addressed by lines C1, R2. See, FIG. 6 for exemplary pixel access row and ring assignments. The system of reference is continued for the remainder of the FPA.

Detector/pixel and ROIC manufacturing techniques would translate to the radial readout approach with a new deposition 'mask set'. The detector element pixels are created and arranged on the FPA and ROIC using conventional foundry manufacturing techniques depending upon the spectral response required. Visible imagers are manufactured monolithically with detector and readout deposition occurring as part of the same process. For another example, Long Wave InfraRed (LWIR) imagers using uncooled microbolometers would have the ROIC fabricated in Silicon and then the detectors deposited in the usual Micro Electro Mechanical System (MEMS) fashion at the specified pixel sites.

Figure 7:
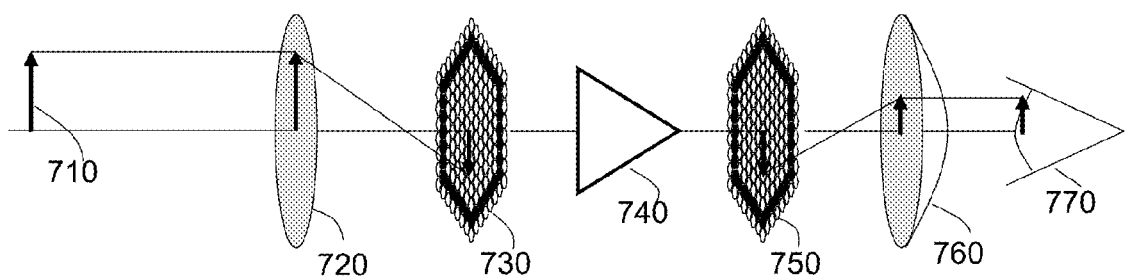
FIG. 7 shows exemplary electro-optic EO imaging system with radial components.

An exemplary EO system is comprised of: objective optics (reduced element count or alternative), FPA/ROIC, support electronics (reduced memory requirements), display and display eyepiece (see, FIG. 7 for an exemplary EO system with radial components). FIG. 7 also serves to illustrate the radial readout process for such an electro-optic imager. As shown in FIG. 7, an object 710 in image space is projected onto an objective lens assembly 720 (e.g., diffractive, holographic, coded wave front, etc.), which focuses it onto an alternate focal plane array 730. A readout integrated circuit (ROIC) 740, with its support electronics and display drivers with reduced processing complexity and memory requirements, reads out the alternate focal plane array signals for processing to an alternate display 750 which projects a reconstructed image of said object 710 onto a simplified eyepiece lens assembly 760 for observer's viewing 770. When the sensor FPA is arranged, read out, processed, and displayed in a circular/hexagonal fashion when combined with standard optical designs, it will simplify the EO system and better preserve overall performance, while providing a path to increased performance without significant processing burdens. The shape of the pixel and pixel site is not necessarily as important as the arrangement in the proposed implementation, but certain shapes better lend themselves to the radial FPA; in this case the pixels and FPA are hexagonal.

ADVANTAGES: Approaching system implementation from an optical axis perspective naturally lends itself to a less complicated system, by not considering rectangles and associated aspect ratios; most optical effects are more easily related to radial distance from the optical axis rather than from a rectilinear coordinate system originating at an arbitrary point in optical space. Advantages would be applicable to all types of optical elements (diffractive, holographic, wave front coded, etc.), and any aberrations more easily corrected by Image Processing (IP) algorithms. In addition, IP algorithms are greatly simplified by operations and corrections referenced to a distance in image space from the optical axis, with associated reduction in processing hardware. When optical effects are related to a distance from a central optical axis, the IP to control/correct those effects are correlated to FPA rings and done at once, thereby minimizing the counting and electronic 'housekeeping' to convert circular optical effects to a rectilinear system of FPA addressing and processing.

As an advantageous alternative read out approach, the rings could be read interlaced by reading the center rings to the outside and outer rings to the inside where they would meet in the middle. Such an approach would normalize the read time cycle for processing an interlaced pair of rings and further simplify the processing and electronics housekeeping. In any case, the preferred read out method includes a 'snapshot' approach, with subsequent read, rather than a 'rolling shutter' approach, to minimize motion artifacts in the final system.

The information is buffered in memory and sent to the display drivers for system optical output at the display.

Standard optical designs are simplified at the objective and eyepiece system, with reduced components and preserve resolution performance, which enables lighter weight and less costly systems. Standard optical designs could be replaced by even lighter weight alternatives. In addition, a radial FPA could better use conical lenses/reflectors for a 360 degree Field of View system than the standard rectilinear FPA.

Figure 8A:
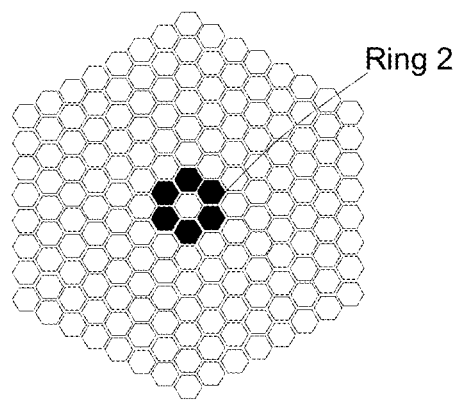
FIG. 8a shows exemplary rings of pixels, with ring 2 shown darkened.
Figure 8B:
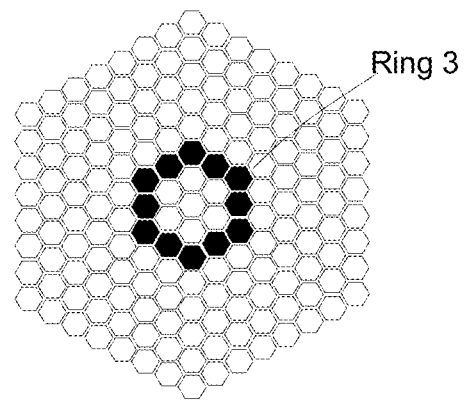
FIG. 8b shows exemplary rings of pixels, with ring 3 shown darkened.
Figure 8C:
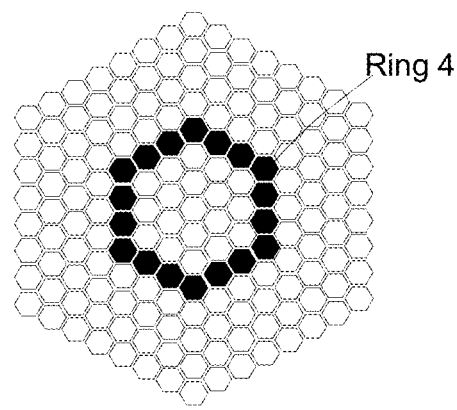
FIG. 8c shows exemplary rings of pixels, with ring 4 shown darkened.
Figure 8D:
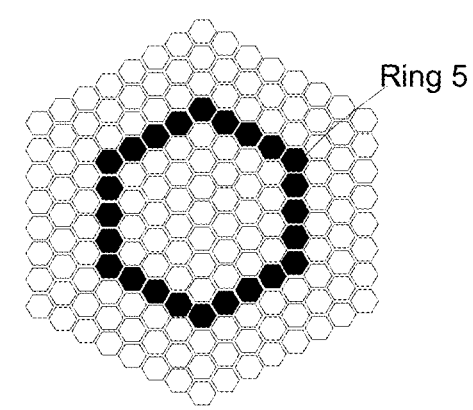
FIG. 8d shows exemplary rings of pixels, with ring 5 shown darkened.
Figure 8E:
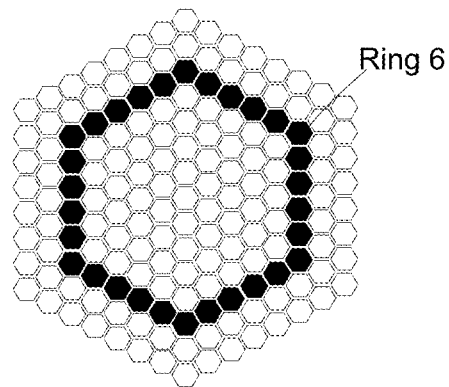
FIG. 8e shows exemplary rings of pixels, with ring 6 shown darkened.
Figure 8F:
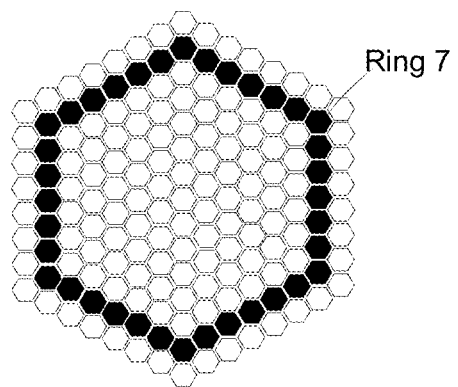
FIG. 8f shows exemplary rings of pixels, with ring 7 shown darkened.
Figure 8G:
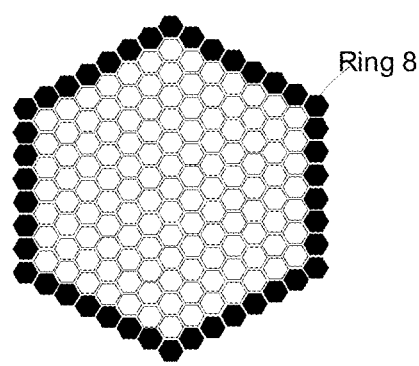
FIG. 8g shows exemplary rings of pixels, with ring 8 shown darkened.

Display formats and mapping replicate the FPA format, if not the pixel element shape itself, for a uniform match to the FPA. Display drivers energize the pixels in a radial nature depending upon the ROIC read approach, in this case concentrically, progressively, and clockwise on a 'ring by ring' basis from the center of the FPA to the edge. See, e.g., FIGS. 8a-g, wherein FIG. 8a shows exemplary rings of pixels, with ring 2 shown darkened; FIG. 8b shows exemplary rings of pixels, with ring 3 shown darkened; FIG. 8c shows exemplary rings of pixels, with ring 4 shown darkened; FIG. 8d shows exemplary rings of pixels, with ring 5 shown darkened; FIG. 8e shows exemplary rings of pixels, with ring 6 shown darkened; FIG. 8f shows exemplary rings of pixels, with ring 7 shown darkened; FIG. 8g shows exemplary rings of pixels, with ring 8 shown darkened. The implementation provides a system more closely matched to optical design using circular optics, while not discarding performance.

APPLICATIONS: The new invention could be used in Soldier equipment as a headborne, helmet mounted, or handheld Electro Optic imaging system, or imaging component if fused with other sensor imagery, for mobility and Situational Awareness. Headborne weight and Center of Gravity (CG) is a consistent concern for Dismounted Soldiers due to the direct correlation to neck injury potential and user fatigue; lighter headborne weight decreases the potential for neck injury, while improved CG reduces fatigue. Headborne systems for mobility would have an overall system magnification of 1×, while a handheld system is suitable for higher magnification.

The present invention can also be used in Soldier equipment as a weapon mounted Electro Optic imaging system, or imaging component if fused with other sensor imagery, for target detection and engagement. Weapon mounted weight and weapon Center of Gravity are a consistent concern for Dismounted Soldiers due to the direct correlation to weapon slew rate, or the ability to quickly move the weapon to engage targets.

The present invention could also be used with alternative objective optics, to include a conical reflector to provide 360 degree Situational Awareness for vehicle protection sensor systems.

It is obvious that many modifications and variations of the present invention are possible in light of the above teachings. It is therefore to be understood that within the scope of the appended claims, the invention may be practiced otherwise than as described.

What is claimed is:

1. A radial focal plane array (FPA) having rings of pixels around a center pixel based on radial addressing the radial focal plane array comprising:
   a center pixel of the radial FPA having an assigned initial pair of address values to designate the center pixel of the radial FPA, wherein one of the address pair is a row address and another of the address pair is a ring address;
   rings of pixels, wherein each ring of pixels successively ringing around said center pixel is assigned a unique ring value using said ring address of the address pair, and wherein each pixel of each ring of pixels is assigned a row value using the row address of the address pair;
   row and ring access lines for reading out signals from the pixels using said address pairs; and
   a read-out integrated circuit connected to said row and ring access lines to read-out said signals from said pixels to generate radial read-out signals, wherein said radial focal plane array is better matched to a circular optical design of circular optics to achieve radial focal plane array read-outs while not discarding performance.

2. The radial focal plane array recited in claim 1, wherein said initial pair of address values is 1, 1.

3. The radial focal plane array recited in claim 1, wherein each ring of pixels successively ringing said center pixel is assigned a correspondingly incremented ring value using said ring address of the address pair.

4. The radial focal plane array recited in claim 1, wherein each successive pixel of a given ring of pixels is assigned a correspondingly incremented row value within its sector using said row address of the address pair.

5. The radial focal plane array recited in claim 1, wherein the row assignment of each successive pixel of a given ring is successively assigned in a clockwise direction in sequence.

6. The radial focal plane array recited in claim 1, wherein the layout of the radial FPA is partitioned into sectors, each sector having its sector row access lines defined.

7. The radial focal plane array recited in claim 1, wherein the radial FPA has sector assignments and row access lines, and wherein ring access lines are defined across all sectors.

8. The radial focal plane array recited in claim 1, wherein image processing algorithms compute operations and corrections referenced to a distance in image space from the optical axis, with associated reduction in processing hardware.

9. The radial focal plane array recited in claim 1, wherein said ring values are read interlaced by reading the center rings to the outside and outer rings to the inside, where the interlaced reading sequentially approaches the middle.

10. The radial focal plane array recited in claim 1, wherein either a snapshot or a rolling shutter approach is used to readout the address values such that information based on the readout address values is buffered in memory and sent to display drivers for system optical output or display.

* * * * *